(12) United States Patent
Mao (10) Patent No.: US 12,262,000 B2
(45) Date of Patent: Mar. 25, 2025

(54) DATA TRANSMISSION METHOD AND RELATED APPARATUS

(71) Applicant: Tencent Technology (Shenzhen) Company Limited, Shenzhen (CN)

(72) Inventor: Junling Mao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 70 days.

(21) Appl. No.: 18/132,149

(22) Filed: Apr. 7, 2023

(65) Prior Publication Data
US 2023/0247190 A1 Aug. 3, 2023

Related U.S. Application Data

(63) Continuation of application No. PCT/CN2022/104253, filed on Jul. 7, 2022.

(30) Foreign Application Priority Data

Aug. 6, 2021 (CN) .................. 202110902563.X (51) Int. Cl.
*H04N 19/105* (2014.01)
*H04N 19/172* (2014.01)
*H04N 19/177* (2014.01)

(52) U.S. Cl.
CPC ......... *H04N 19/105* (2014.11); *H04N 19/172* (2014.11); *H04N 19/177* (2014.11)

(58) Field of Classification Search
CPC .. H04N 19/164; H04N 19/105; H04N 19/166; H04N 19/172; H04N 19/177; H04N 19/58; H04N 19/89; H04N 21/6375
(Continued)

(56) References Cited

U.S. PATENT DOCUMENTS

2019/0260999 A1* 8/2019 Xiong .................. H04N 19/114

FOREIGN PATENT DOCUMENTS

| CN | 102014286 A | 4/2011 |
|---|---|---|
| CN | 103385000 A | 11/2013 |

(Continued)

OTHER PUBLICATIONS

Tencent Technology, WO, PCT/CN2022/104253, Sep. 13, 2022, 4 pgs.

(Continued)

*Primary Examiner* — Thai Q Tran
*Assistant Examiner* — Nienru Yang
(74) *Attorney, Agent, or Firm* — Morgan, Lewis & Bockius LLP (57) ABSTRACT

This application discloses a data transmission method performed by a computer device. It is detected that the $i^{th}$ forward reference frame is lost, during video decoding, when the $(i+T+1)^{th}$ forward reference frame is decoded, since a video frame in a first reference frame combination of the $(i+T+1)^{th}$ forward reference frame is located before the $(i+T+1)^{th}$ forward reference frame with an interval of T forward reference frames from the $(i+T+1)^{th}$ forward reference frame, T being a positive integer, so that before the $(i+T+1)^{th}$ forward reference frame is decoded, there is more time for retransmitting the $i^{th}$ forward reference frame, improving a possibility of completing retransmission of the $i^{th}$ forward reference frame during decoding of the $(i+T+1)^{th}$ forward reference frame, thereby reducing a possible waiting time for decoding the $(i+T+1)^{th}$ forward reference frame.

17 Claims, 5 Drawing Sheets

(58) Field of Classification Search
USPC .......................................................... 386/353
See application file for complete search history.

(56) References Cited

FOREIGN PATENT DOCUMENTS

| | | | | |
|---|---|---|---|---|
| CN | 110166776 A | 8/2019 | | |
| CN | 112351285 A | 2/2021 | | |
| WO | WO-2006072265 A1 * | 7/2006 | ........... | H04N 19/114 |

OTHER PUBLICATIONS

Tencent Technology, IPRP, PCT/CN2022/104253, Feb. 6, 2024, 5 pgs.
Tencent Technology, ISR, PCT/CN2022/104253, Sep. 29, 2022, 2 pgs.

* cited by examiner

DATA TRANSMISSION METHOD AND RELATED APPARATUS

CROSS-REFERENCE TO RELATED APPLICATIONS

This application is a continuation application of PCT Patent Application No. PCT/CN2022/104253, entitled "DATA TRANSMISSION METHOD AND RELATED APPARATUS" filed on Jul. 7, 2022, which claims priority to Chinese Patent Application No. 202110902563.X, entitled "DATA TRANSMISSION METHOD AND RELATED APPARATUS" and filed with the China National Intellectual Property Administration on Aug. 6, 2021, all of which is incorporated herein by reference in its entirety.

FIELD OF THE TECHNOLOGY

This application relates to the field of communication technologies, and in particular, to data transmission.

BACKGROUND OF THE DISCLOSURE

With the development of communication technology, multimedia communication based on video and audio has gradually become mainstream business of the communication technology, and will provide people with multimedia communication services anytime and anywhere.

At present, during video communication service, an encoder side sends encoded video frames to a receiving end. During transmission, some video frames (such as forward reference frames) may be lost. In order to reduce an impact of a forward reference frame loss, in a conventional manner, reference frame selection technology is mainly adopted, that is, through acknowledgement information fed back by the receiving end, the encoder side selects the closest correct decoded frame as a reference frame for subsequent inter-frame encoding, thereby reducing the impact of the forward reference frame loss.

However, in this way, the encoder side needs to wait for the receiving end to feed back the received acknowledgement information before starting encoding a next forward reference frame, so as to increase a delay at the encoder side, thereby causing a delay and unsmooth video playback at the receiving end.

SUMMARY

To resolve the above technical problem, this application provides a data transmission method and a related apparatus, which reduces a delay at an encoder side and further reduces a delay of video playback at a receiving end, to improve smoothness of the video playback.

In embodiments of this application, the following technical solution is disclosed.

According to an aspect, an embodiment of this application provides a data transmission method, performed by a decoding device, the method including:

detecting a receiving status of a forward reference frame;

detecting that the $i^{th}$ forward reference frame in a group of pictures is lost during forward reference frame transmission, a video frame corresponding to the $i^{th}$ forward reference frame being located in a first reference frame combination of the $(i+T+1)^{th}$ forward reference frame, a video frame in the first reference frame combination being located before the $(i+T+1)^{th}$ forward reference frame, and the $i^{th}$ forward reference frame being a video frame closest to the $(i+T+1)^{th}$ forward reference frame in the first reference frame combination with an interval of T forward reference frames from the $(i+T+1)^{th}$ reference frame, T being a positive integer, and i being a positive integer greater than 0; and     when the $(i+1)^{th}$ forward reference frame is decoded during video decoding, decoding the $(i+1)^{th}$ forward reference frame using a first reference frame combination including the $i^{th}$ forward reference frame that is retransmitted.

According to another aspect, an embodiment of this application further provides a data transmission method, performed by an encoding device, the method including:

determining a reference frame combination corresponding to each to-be-encoded video frame in a group of pictures, a video frame in the reference frame combination being located before the corresponding to-be-encoded video frame with an interval of at least T video frames from the to-be-encoded video frame, T being a positive integer;

performing inter-frame encoding on each video frame in sequence through a corresponding reference frame combination to obtain a corresponding forward reference frame, and transmitting the obtained forward reference frame to a receiving end; and     retransmitting the $i^{th}$ forward reference frame to the receiving end when acknowledgement information from the receiving end is received, and the acknowledgement information indicates that the $i^{th}$ forward reference frame is lost during forward reference frame transmission, i being a positive integer greater than 0.

According to another aspect, an embodiment of this application provides a data transmission apparatus, including a detection unit and a decoding unit.

The detection unit is configured to detect a receiving status of a forward reference frame.

The detection unit is configured to detect that the $i^{th}$ forward reference frame in a group of pictures is lost during forward reference frame transmission, the $i^{th}$ forward reference frame is located in a first reference frame combination of the $(i+T+1)^{th}$ forward reference frame, a video frame in the first reference frame combination being located before the $(i+1)^{th}$ forward reference frame, and the $i^{th}$ forward reference frame is a video frame closest to the $(i+1)^{th}$ forward reference frame in the first reference frame combination with an interval of T forward reference frames from the $(i+T+1)^{th}$ forward reference frame, T being a positive integer, and i being a positive integer greater than 0.

The decoding unit is configured to decode, when the $(i+T+1)^{th}$ reference frame is decoded during video decoding, the $(i+T+1)^{th}$ forward reference frame using the first reference frame combination including the $i^{th}$ forward reference frame that is retransmitted.

According to another aspect, an embodiment of this application provides a data transmission apparatus, including a determining unit, an encoding unit, a transmission unit, and a retransmission unit.

The determining unit is configured to determine a reference frame combination corresponding to each to-be-encoded video frame in a group of pictures, and a video frame in the reference frame combination is located before the to-be-encoded video frame with an interval of at least T video frames from the to-be-encoded video frame, T being a positive integer.

The encoding unit is configured to perform inter-frame encoding on each video frame in sequence through a corresponding reference frame combination to obtain a corresponding forward reference frame.

The transmission unit is configured to transmit the obtained forward reference frame to a receiving end.

The retransmission unit is configured to retransmit the $i^{th}$ forward reference frame to the receiving end, when acknowledgement information from the receiving end is received, and the acknowledgement information indicates that the $i^{th}$ forward reference frame is lost during forward reference frame transmission, i being a positive integer greater than 0.

According to another aspect, an embodiment of this application provides a device for data transmission, including a processor and a memory.

The memory is configured to store program code and transmit the program code to the processor.

The processor is configured to perform the method according to the foregoing aspect according to instructions in the program code.

According to another aspect, an embodiment of this application provides a non-transitory computer-readable storage medium, configured to store program code, the program code being used for performing the method in the foregoing aspect.

According to another aspect, an embodiment of this application provides a computer program product including instructions, the instructions, when run on a computer, causing the computer to perform the method according to the foregoing aspect.

Based on the above technical solution, the encoder side may encode the video frame and transmit the obtained forward reference frame to the receiving end, the receiving end may detect whether the forward reference frame is lost during transmission. When the $i^{th}$ forward reference frame in the group of pictures is lost during forward reference frame transmission, and during video decoding, when the $(i+T+1)^{th}$ reference frame is decoded, since the video frame in the first reference frame combination of the $(i+T+1)^{th}$ forward reference frame is located before the $(i+T+1)^{th}$ forward reference frame, and the $i^{th}$ forward reference frame is the video frame closest to the $(i+T+1)^{th}$ reference frame in the first reference frame combination with an interval of T forward reference frames from the $(i+T+1)^{th}$ forward reference frame, T being a positive integer, before the $(i+T+1)^{th}$ forward reference frame is decoded, there is more time for retransmitting the $i^{th}$ forward reference frame, to improve a possibility of completing retransmission of the $i^{th}$ forward reference frame when the $(i+T+1)^{th}$ forward reference frame is decoded, thereby reducing a possible waiting time for decoding the $(i+T+1)^{th}$ reference frame. Therefore, the receiving end may directly decode the $(i+T+1)^{th}$ forward reference frame using the first reference frame combination including the $i^{th}$ forward reference frame that is retransmitted. According to the method, encoding and decoding are performed according to a frame-straddling reference intra-period, to provide more time for completing retransmission of a lost forward reference frame in a reference frame combination before a certain forward reference frame is decoded, thereby reducing an impact of a forward reference frame loss on video playback at the receiving end. Based on this, the encoder side does not need to wait for the acknowledgement information fed back by the receiving end, and can directly encode a next forward reference frame, to reduce a delay at the encoder side, thereby reducing a delay of the video playback at the receiving end and improving smoothness of the video playback.

DESCRIPTION OF EMBODIMENTS

The following describes embodiments of this application with reference to the accompanying drawings.

First, terms involved in this application are explained.

Inter-frame reference encoding is a commonly used encoding technology, which is adopted in H.264/H.265 and other specifications. To decode an inter-frame reference encoded video frame, all reference frames for reference encoding need to be correctly received. At present, to improve an effect of encoding, inter-frame encoding with multi-reference frame may be adopted. In low-delay transmission, forward reference encoding is generally adopted, that is, during decoding of a current video frame, only a previous video frame is referred to.

Forward reference frame: forward reference frame is a frame that refers to a previous video frame in video encoding and that is encoded using the inter-frame encoding technology with a relatively small encoding size, and decoding needs to depend on the video frame being forward referred to during encoding, which is different from a frame that is encoded using the intra-frame encoding technology.

Group of Pictures (GoP): a group of consecutive pictures in a video is used as a group of pictures in video encoding. In low-delay video transmission, generally, in a GoP, the first video frame after being encoded is an I frame, and a subsequent video frame is a forward reference frame (P frame).

Figure 1:
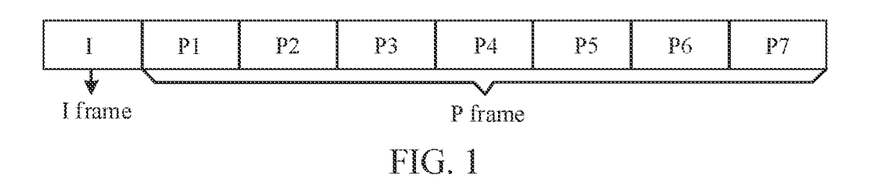
FIG. 1 is a schematic diagram of a group of pictures according to an embodiment of this application.

FIG. 1 shows a GoP (that is, a group of pictures), and the group of pictures includes eight video frames after being encoded. The first video frame is an I frame, and the second video frame to the last video frame need to refer to a previous video frame and are obtained by encoding using the inter-frame encoding technology, which are forward reference frames (P frames). The group of pictures includes a plurality of P frames, the second video frame is the first P frame (P1), the third video frame is the second P frame (P2), the fourth video frame is the third P frame (P3), the fifth video frame is the fourth P frame (P4), the sixth video frame is the fifth P frame (P5), the seventh video frame is the sixth P frame (P6), and the eighth video frame is the seventh P frame (P7).

Figure 2:
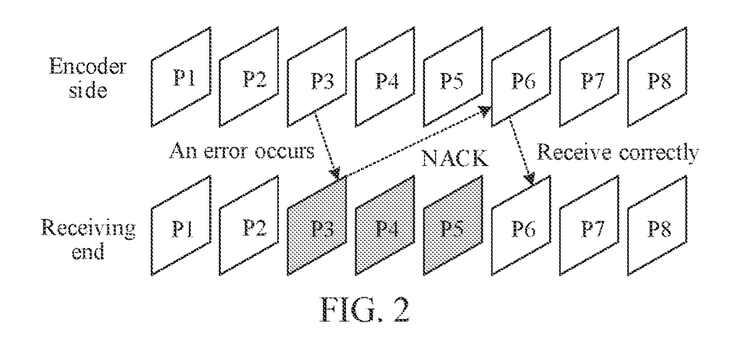
FIG. 2 is a schematic diagram of a data transmission method according to a related technology.

The forward reference frame may be lost during transmission, to reduce an impact of a forward reference frame loss, the reference frame selection technology is mainly adopted in a conventional manner. That is, through acknowledgement information fed back by a receiving end, such as ACK information or NACK information, an encoder side selects a closest correct decoded frame as a reference frame, to perform subsequent inter-frame encoding, thereby reducing the impact of the forward reference frame loss. Referring to FIG. 2, an error occurs at P3, a receiving end feeds back NACK information to an encoder side, P4 cannot be correctly decoded due to reference to P3, and also transmits NACK information back which indicates that an error occurs at P3, and P5 cannot be correctly decoded due to reference to P3 either, and also transmits NACK information back which indicates that an error occurs at P3. When encoding P6, after receiving the NACK information that indicates that an error occurs at P3, the encoder side adjusts a frame memory and uses the frame P2 that is correctly decoded as a reference frame. After the receiving end correctly receives encoded data of P6, normal decoding is restored.

However, in this way, the encoder side needs to wait for the receiving end to feed back received acknowledgement information before starting encoding a next forward reference frame, so as to increase a delay at the encoder side, thereby causing a delay and unsmooth video playback at the receiving end.

To resolve the above technical problem, the embodiments of this application provide a data transmission method. The method may be applied to various transmission scenarios that requires a low delay, for example, 5th Generation Mobile Communication Technology (5G) dedicated network remote control and other scenarios with a low network loss rate and very strict requirements for a delay. 5G dedicated network remote control may include remote control of a rover on the moon or Mars, an unmanned driving ship, a remote driving vehicle (such as auxiliary driving, autonomous driving, and remote control driving), and the like.

In such a scenario, a frame rate is high. The high frame rate is introduced to reduce a delay, such as 60 FPS (Frames Per Second). A frame loss rate is low, because a 5G air interface can perform retransmission, and a quantity of routers is very small, a frame is rarely lost. A delay that a receiving end detects to send NACK information or ACK information and notifies an encoder side ranges about from 10 ms to 15 ms. When a frame is lost, about 10 ms to 15 ms is further required for the encoder side to re-send a data packet and the receiving end to receive the data packet. For a frame rate of 60 FPS, if the reference frame selection technology is adopted, the encoder side waits for the NACK information or the ACK information to encode again, at least a delay of one frame is further added.

According to the method provided in the embodiments of this application, a proper frame-straddling reference intra-period is determined according to a retransmission delay, to ensure that before a certain forward reference frame is decoded, retransmission of a lost forward reference frame in the reference frame combination is completed, thereby reducing an impact of the forward reference frame loss on video playback at the receiving end. Based on this, the encoder side does not need to wait for the acknowledgement information fed back by the receiving end, and can directly encode a next forward reference frame, to reduce a delay at the encoder side, thereby reducing a delay of the video playback at the receiving end and improving smoothness of the video playback.

The method provided in the embodiments of this application relates to the field of cloud technologies, for example, the field of cloud computing. Cloud computing is a computing mode, in which computing tasks are distributed on a resource pool formed by a large quantity of computers, so that various application systems can obtain computing power, storage space, and information services according to requirements. A network that provides resources is referred to as a "cloud". For a user, resources in a "cloud" seem to be infinitely expandable, and can be obtained readily, used on demand, expanded readily, and paid according to usage. A basic capability provider for cloud computing establishes a cloud computing resource pool (a cloud platform for short, and is generally referred to as IaaS (Infrastructure as a Service) platform), and deploys various types of virtual resources in the resource pool, for external clients to select for use. The cloud computing resource pool mainly includes: a computing device (a virtual machine, including an operating system), a storage device, and a network device. Divided based on logic function, a PaaS (Platform as a Service) layer may be deployed on an IaaS (Infrastructure as a Service) layer, and a SaaS (Software as a Service) layer is further deployed on the PaaS layer, or the SaaS may be directly deployed on IaaS. PaaS is a platform for software running, such as a database and a web container. SaaS is business software of various types, such as a web portal site and a short message group sender. Generally, the SaaS and the PaaS are upper layers relative to the IaaS.

Figure 3:
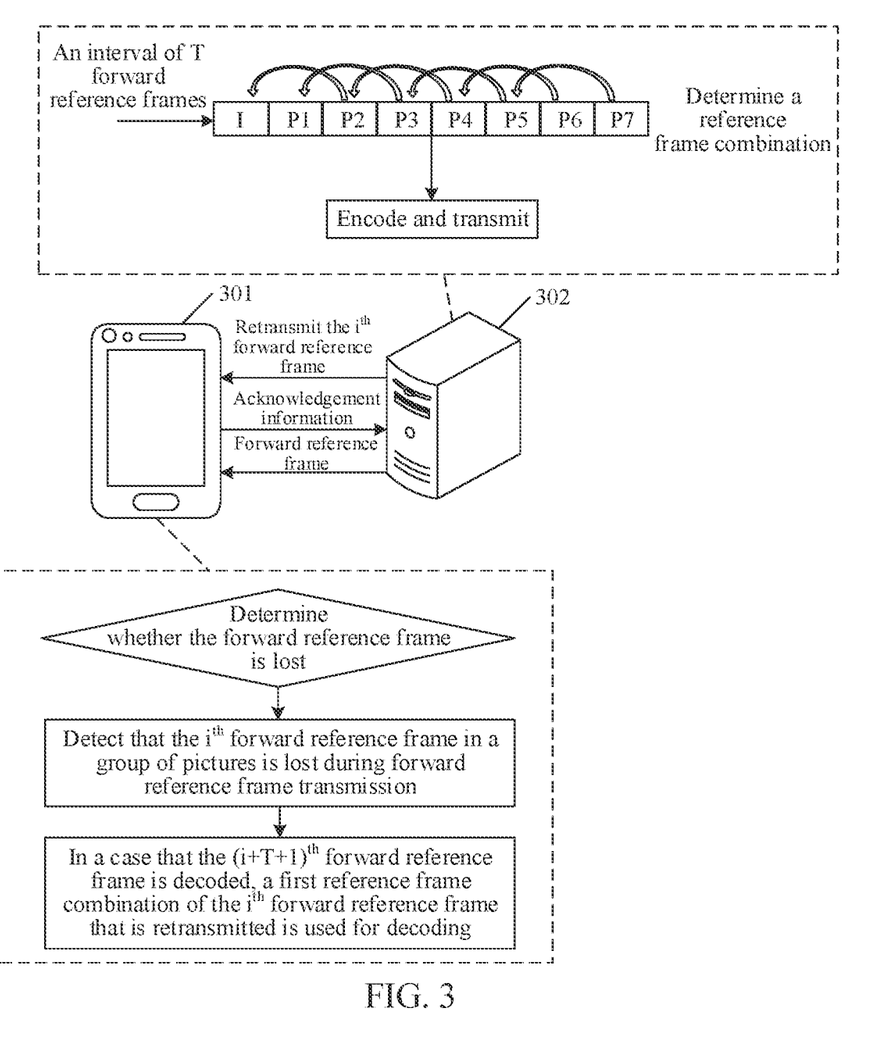
FIG. 3 is a schematic diagram of a system architecture of a data transmission method according to an embodiment of this application.

The following describes a system architecture of data transmission. FIG. 3 is a schematic diagram of a system architecture of a data transmission method according to an embodiment of this application. The system architecture includes a terminal 301 and a server 302, where the terminal 301 may be used as a receiving end, and the server 302 may be used as an encoder side. The server 302 encodes a video frame in a video frame sequence to obtain an encoded video frame, and transmits the encoded video frame to the terminal 301, to complete rendering and playing on the terminal 301. A group of consecutive pictures in a video is a group of pictures in video encoding. Therefore, the first video frame after being encoded may be referred to as an I frame, and a subsequent video frame may be referred to as a forward reference frame.

In a same group of pictures, a forward reference frame needs to refer to a previous video frame and adopts the inter-frame encoding technology to perform encoding. Therefore, when a forward reference frame is lost during transmission, decoding of the subsequent forward reference frame may be affected, and encoding at the encoder side may also be affected, thereby causing a delay.

Therefore, in the embodiments of this application, the server 302 encodes the video frame in a frame-straddling reference manner. In other words, when inter-frame encoding is performed on a to-be-encoded video frame, the encoding is performed referring to a reference frame combination before the forward $T^{th}$ frame, that is, the video frame in the reference frame combination corresponding to the to-be-encoded video frame is located before the corresponding to-be-encoded video frame with an interval of at least T video frames from the to-be-encoded video frame, T being a positive integer. For example, T may be determined according to a retransmission delay, so that retransmission of the lost forward reference frame in the reference frame combination is completed before the forward reference frame is decoded. The reference frame combination may include a video frame (that is, single-frame reference), or may include a plurality of video frames (that is, multi-frame reference). The single-frame reference is used as an example in FIG. 3, T=1, and a finally determined reference frame combination is that P2 refers to the I frame, P3 refers to P1, P4 refers to P2, P5 refers to P3, P6 refers to P4, and P7 refers to P5.

In this way, the encoder side can perform inter-frame encoding on each video frame through a corresponding reference frame combination in sequence to obtain a corresponding forward reference frame and transmit the obtained forward reference frame to the receiving end. T is a positive integer, there is more time for retransmission of the lost forward reference frame in the reference frame combination before the forward reference frame is decoded, so that a possibility of completing retransmission of the $i^{th}$ forward reference frame is improved when the $(i+T+1)^{th}$ forward reference frame is decoded, thereby reducing a possible waiting time for decoding the $(i+T+1)^{th}$ reference frame.

The server 302 does not pay attention to a lost video frame that is referred to during transmission, and decoding at the decoder side is not affected. Therefore, the server 302 can perform decoding on a next forward reference frame without waiting for acknowledgement information from the receiving end (terminal 301), to reduce a delay at the encoder side (server 302).

The terminal 301 can determine whether the forward reference frame is lost according to a receiving status. When detecting that the $i^{th}$ forward reference frame in the group of pictures is lost during forward reference frame transmission, the terminal 301 may send the acknowledgement information to the server 302. When receiving the acknowledgement information from the terminal 301, and the acknowledgement information indicates that the $i^{th}$ forward reference frame is lost during forward reference frame transmission, the server 302 retransmits the $i^{th}$ forward reference frame to the terminal 301, i being a positive integer greater than 0.

The terminal 301 may decode the received forward reference frame. During video decoding, in a case of decoding the $(i+T+1)^{th}$ reference frame, since retransmission of the $i^{th}$ forward reference frame is possibly completed in this case, the first reference frame combination including the $i^{th}$ forward reference frame that is retransmitted may be directly used or may be used after waiting for a short time to decode the $(i+T+1)^{th}$ forward reference frame.

The server 302 may be an independent physical server, or may be a server cluster including a plurality of physical servers or a distributed system, or may further be a cloud server that provides cloud computing services. The terminal 301 may be a smart phone, a tablet computer, a notebook computer, a desktop computer, a smart speaker, a smartwatch, an in-vehicle terminal, a smart television, or the like, but is not limited thereto. The terminal 301 and the server 302 may be directly or indirectly connected in a wired or wireless communication manner. This is not limited in this application.

The following describes the data transmission method provided in the embodiments of this application in detail with reference to the accompanying drawings from a perspective of interaction between an encoder side and a receiving end, where the encoder side is an encoding device, the encoding device may be a server or a terminal, the receiving end is a decoding device, and the decoding device may be a terminal.

Figure 4:
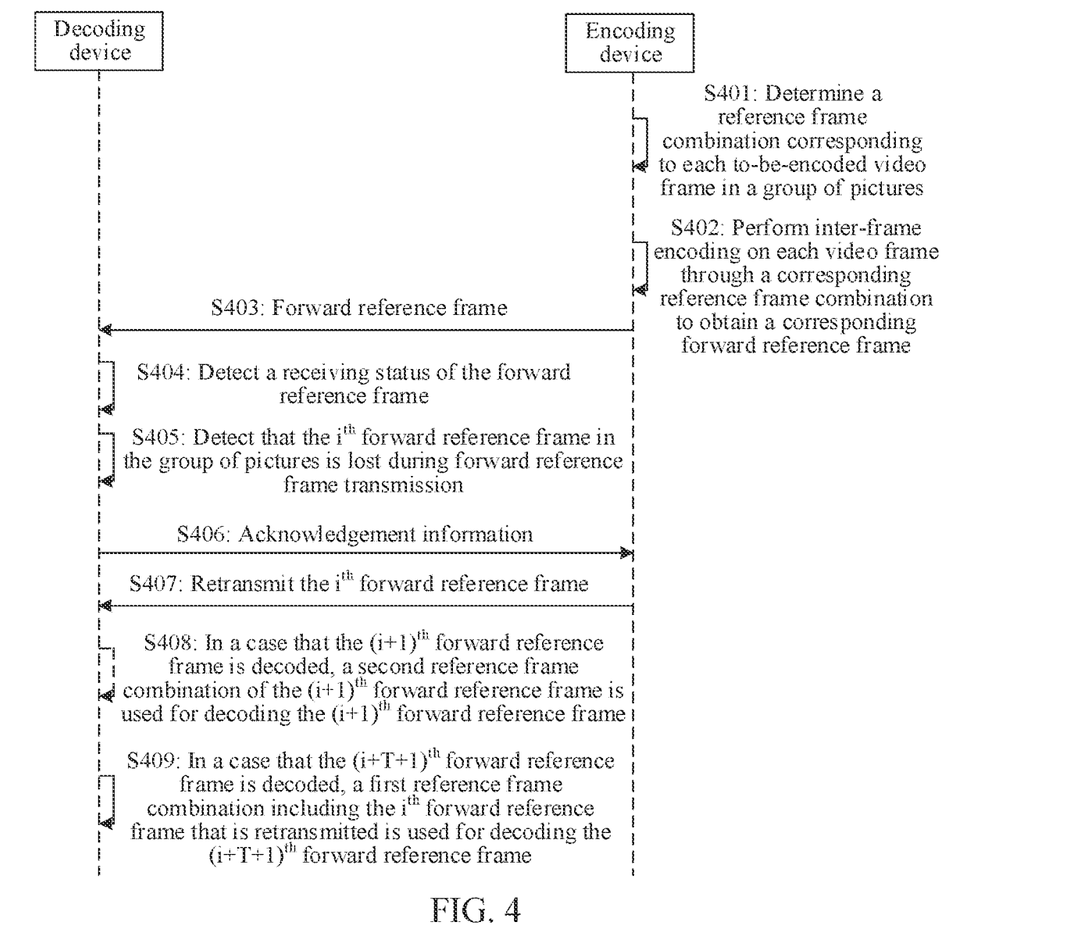
FIG. 4 is a diagram of signaling interaction of a data transmission method according to an embodiment of this application.

FIG. 4 is a diagram of signaling interaction of a data transmission method, including the following steps.

S401: An encoder side determines a reference frame combination corresponding to each to-be-encoded video frame in a group of pictures.

It may be understood that, this application mainly reduces a delay impact of a forward reference frame loss on the encoder side and a receiving end. The forward reference frame loss affects the encoder side and the receiving end because the forward reference frame is encoded and decoded depending on the lost forward reference frame. However, due to a frame loss, retransmission of the lost forward reference frame needs some time, so that the retransmission cannot be completed before decoding, and decoding cannot be performed. Therefore, the encoder side needs to wait for acknowledgement information of the receiving end to determine whether a previous forward reference frame is lost and then decodes a next forward reference frame.

Therefore, in the embodiments of this application, the encoder side performs inter-frame encoding in a frame-straddling reference manner. In other words, when the inter-frame encoding is performed on a to-be-encoded video frame, the encoding is performed referring to a reference frame combination before the forward $T^{th}$ frame. That is, the video frame in the reference frame combination corresponding to the to-be-encoded video frame is located before the corresponding to-be-encoded video frame with an interval of at least T video frames from the to-be-encoded video frame, T being a positive integer. There is more time for retransmission of the lost forward reference frame in the reference frame combination before the forward reference frame is decoded, so that a possibility of completing retransmission of the $i^{th}$ forward reference frame is improved when the $(i+T+1)^{th}$ forward reference frame is decoded, thereby reducing a possible waiting time for decoding the $(i+T+1)^{th}$ forward reference frame.

In a possible implementation, T is a positive integer determined according to a retransmission delay, so that the retransmission of the lost forward reference frame in the reference frame combination can be completed before the forward reference frame is decoded. In this way, the encoder side does not need to wait for the acknowledgement information fed back by the receiving end, and does not need to determine whether the transmitted forward reference frame is lost and then encodes to obtain a next forward reference frame. There is no delay at the receiving end since the receiving end cannot decode in time due to the forward reference frame loss, and no delay at the encoder side since the encoder side waits for the acknowledgement information.

Figure 5:
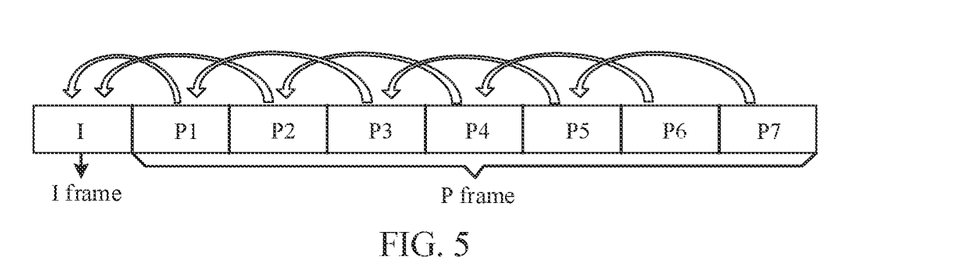
FIG. 5 is a schematic diagram of reference relationship between video frames in a group of pictures in a single-frame reference scenario according to an embodiment of this application.

In this embodiment, the reference frame combination may include a video frame (that is, single-frame reference), or may include a plurality of video frames (that is, multi-frame reference). Referring to FIG. 5, the single-frame reference is used as an example, and T=1, which reflects reference relationship between video frames in a group of pictures, and a finally determined reference frame combination is that P2 refers to the I frame (a reference frame combination of a to-be-encoded video frame corresponding to P2 including the I frame), P3 refers to P1 (a reference frame combination of a to-be-encoded video frame corresponding to P3 including the P1 frame), P4 refers to P2 (a reference frame combination of a to-be-encoded video frame corresponding to P4 including the P2 frame), P5 refers to P3 (a reference frame combination of a to-be-encoded video frame corresponding to P5 including the P3 frame). P6 refers to P4 (a reference frame combination of a to-be-encoded video frame corresponding to P6 including the P4 frame), and P7 refers to P5 (a reference frame combination of a to-be-encoded video frame corresponding to P7 including the P5 frame).

It is to be understood that, in this embodiment, T may be a positive integer determined according to a retransmission delay, so that retransmission of the lost forward reference frame in the reference frame combination can be completed before the forward reference frame is decoded. A retransmission delay is time consumed by retransmission of a lost forward reference frame. To ensure that retransmission of the lost forward reference frame in the reference frame combination is completed before a certain forward reference frame is decoded, a product of frame duration of the forward reference frame and T+1 is greater than the retransmission delay.

The retransmission delay is determined by detecting duration of a forward reference frame loss, network retransmission duration, duration of decoding a forward reference frame, and catchable duration of a forward reference frame delay. The retransmission delay may be generally equal to duration of a forward reference frame loss (including NACK information or ACK information network notification)+ network retransmission duration+duration of decoding a forward reference frame−catchable duration (a receiving delay tolerated for normal playback). In other words, for determining T, the frame duration*(T+1) needs to be greater than detecting duration of a forward reference frame loss (including NACK information of ACK information network notification)+network retransmission duration+duration of decoding a forward reference frame−catchable duration (a receiving delay tolerated for normal playback).

It may be understood that, because the network retransmission duration is determined according to network quality, and the network quality may change, with better network quality, the network retransmission duration may be shorter, and with a worse network quality, the network retransmission duration may be longer. Therefore, an intra-period of the frame-straddling reference can be adjusted according to the network quality in the embodiments of this application.

However, a time for adjusting T may be different. To avoid excessively frequently adjusting T which reduces processing efficiency, and select an appropriate T as much as possible according to the network quality. T is mainly adjusted at the following two times in the embodiments of this application. A group of pictures may be used as a unit during video frame transmission. Therefore, in a possible implementation, T may be adjusted according to network quality after transmission of a group of pictures is completed.

In some cases, consecutive forward reference frames may be lost, for example, P2, P3, and P4 are lost. Then it may be considered that current network quality is poor, and then a group of pictures is refreshed, to re-determine a reference relationship between video frames in the group of pictures and a refreshed group of pictures. Therefore, in a possible implementation, T may be adjusted according to the network quality during a group of pictures refresh.

If in a group of pictures shown in FIG. 5, P2, P3, and P4 are lost, refresh is performed at P4 at the receiving end. In this case, P5 to P7 and other supplementary video frames form a new group of pictures. The refreshed group of pictures and the group of pictures before refresh may include the same quantity of video frames and include the same combination of video frames. Therefore, T is determined according to the current network quality, and T before refresh is adjusted to implement that a value of T may dynamically meet network quality.

S402: The encoder side performs inter-frame encoding on each video frame through a corresponding reference frame combination to obtain a corresponding forward reference frame.

S403: The encoder side transmits the obtained forward reference frame to the receiving end.

Inter-frame encoding is performed on each video frame according to a determined reference frame combination to obtain a corresponding forward reference frame, the obtained forward reference frame is transmitted to a receiving end, and a local cache is reserved.

S404: The receiving end detects a receiving status of the forward reference frame.

The receiving end receives the forward reference frame transmitted by the encoder side in sequence, detects the receiving status of the forward reference frame, and notifies the encoder side of the acknowledgement information according to a detection result. The acknowledgement information may be the NACK information (for example, when a forward reference frame is lost) or the ACK information (for example, when a forward reference frame is not lost), or the like.

S405: The receiving end detects that the $i^{th}$ forward reference frame in the group of pictures is lost during forward reference frame transmission.

S406: The receiving end sends the acknowledgement information to the encoder side.

When detecting the $i^{th}$ forward reference frame in the group of pictures is lost during forward reference frame transmission, the receiving end sends the acknowledgement information to the encoder side, indicating that the $i^{th}$ forward reference frame is lost during forward reference frame transmission. The video frame according to the $i^{th}$ forward reference frame is located in the first reference frame combination of the $(i+T+1)^{th}$ forward reference frame, the video frame in the first reference frame combination is located before the $(i+T+1)^{th}$ forward reference frame, and the $i^{th}$ forward reference frame is a video frame closest to the $(i+T+1)^{th}$ forward reference frame in the first reference frame combination with an interval of T forward reference frames from the $(i+T+1)^{th}$ forward reference frame. When T is a positive integer determined according to the retransmission delay, the retransmission of the $i^{th}$ forward reference frame may be completed before the $(i+T+1)^{th}$ reference frame is decoded, i being a positive integer greater than 0. The $i^{th}$ forward reference frame may be entirely lost, or may be partially lost.

Referring to FIG. 5, the single-frame reference is used as an example, and T=1, then P2 refers to the I frame (a reference frame combination of a to-be-encoded video frame corresponding to P2 including the I frame), P3 refers to P1 (a reference frame combination of a to-be-encoded video frame corresponding to P3 including the P1 frame), P4 refers to P2 (a reference frame combination of a to-be-encoded video frame corresponding to P4 including the P2 frame), P5 refers to P3 (a reference frame combination of a to-be-encoded video frame corresponding to P5 including the P3 frame), P6 refers to P4 (a reference frame combination of a to-be-encoded video frame corresponding to P6 including the P4 frame), and P7 refers to P5 (a reference frame combination of a to-be-encoded video frame corresponding to P7 including the P5 frame). When i=3, that is, the third forward reference frame P3 is lost, acknowledgement information is sent to the encoder side. The acknowledgement information indicates that the third forward reference frame is lost during forward reference frame transmission.

According to the reference relationship, P3 is located in a first reference frame combination of the fifth (3+1+1) forward reference frame P5, P3 is a video frame closest to P5 in the first reference frame combination with an interval of one forward reference frame P4 from P5. However, the single-frame reference is used as an example in FIG. 5, only P3 is in the first reference frame combination; and when in a scenario of multi-frame reference, the first reference frame combination includes a plurality of video frames before P3.

S407: The encoder side retransmits the $i^{th}$ forward reference frame to the receiving end.

The encoder side retransmits the $i^{th}$ forward reference frame to the receiving end according to the received acknowledgement information. When the $i^{th}$ forward reference frame is entirely lost, the entire $i^{th}$ forward reference frame is retransmitted; or when the $i^{th}$ forward reference frame is partially lost, the lost part of the $i^{th}$ forward reference frame is retransmitted to avoid resource waste.

S408: During video decoding, when the $(i+1)^{th}$ forward reference frame is decoded, the second reference frame combination of the $(i+1)^{th}$ forward reference frame is used for decoding the $(i+1)^{th}$ forward reference frame.

This step is a possible implementation, that is, this step is an optional step, mainly for clarifying that when the $(i+1)^{th}$ forward reference frame is decoded, the second reference frame combination is used, and the second reference frame combination does not include the it forward reference frame. That is, the $i^{th}$ forward reference frame lost does not affect $(i+1)^{th}$ forward reference frame decoding.

It may be understood that, the receiving end detects the receiving status of the forward reference frame, and may mainly perform decoding and rendering on the received forward reference frame to play corresponding pictures at the receiving end.

When normally receiving the current forward reference frame, the receiving end performs decoding and restoring according to a local reference frame cache. When detecting that the $(i+1)^{th}$ reference frame is normally received, when the $(i+1)^{th}$ forward reference frame is decoded, the second reference frame combination of the $(i+1)^{th}$ forward reference frame is used for decoding the $(i+1)^{th}$ reference frame. A video frame in the second reference frame combination is located before the $(i+1)^{th}$ forward reference frame with an interval of at least T forward reference frames from the $(i+1)^{th}$ forward reference frame, that is, the $i^{th}$ forward reference frame is not included.

A P3 loss is still used as an example. When the receiving end normally receives P4 shown in FIG. 5, since P4 is not encoded or decoded referring to P3, P4 can be directly decoded according to P2 in the reference frame cache.

When detecting that a current forward reference frame is lost, and retransmission of the $i^{th}$ forward reference frame is not completed, the receiving end reuses an image of a previous frame to perform rendering on the current forward reference frame. In other words, in a case of detecting that the $i^{th}$ forward reference frame is lost during forward reference frame transmission, when the $i^{th}$ forward reference frame is decoded, the receiving end reuses an image corresponding to a target video frame to perform rendering on the $i^{th}$ forward reference frame, the target video frame being a previous frame of the $i^{th}$ forward reference frame. In this way, an error in rendering is avoided, and a rendering effect and continuity are improved.

S409: When the $(i+T+1)^{th}$ forward reference frame is decoded, the first reference frame combination including the $i^{th}$ forward reference frame that is retransmitted is used for decoding the $(i+T+1)^{th}$ forward reference frame.

Although the $(i+1)^{th}$ forward reference frame that is encoded depending on the $i^{th}$ forward reference frame is decoded, since the interval T of frame-straddling reference is a positive integer, there is enough time for the encoding device to complete retransmission of the $i^{th}$ forward reference frame to the decoding device. In addition, exemplarily, when T is determined according to the retransmission delay, retransmission of the $i^{th}$ forward reference frame may be completed before the $(i+T+1)^{th}$ forward reference frame is decoded. After receiving the $i^{th}$ forward reference frame that is retransmitted, the receiving end places the $i^{th}$ forward reference frame in the local reference frame cache. In this way, when the $(i+T+1)^{th}$ forward reference frame is decoded, the first reference frame combination including the $i^{th}$ forward reference frame that is retransmitted is used for decoding the $(i+T+1)^{th}$ forward reference frame.

The P3 loss is still used as an example, when the receiving end decodes the fifth (3+1+1) forward reference frame P5, before receiving P5, the receiving end receives P3 retransmitted by the encoder side, and therefore, P5 may be decoded based on the P3 that is retransmitted.

The video frame received by the receiving end carries identification information, the identification information is used to reflect a reference relationship between the video frames in a same group of pictures, so as to facilitate knowing that which video frame is referred to by a certain forward reference frame, that is, which video frame is included in a reference frame combination corresponding to the forward reference frame. In this way, during decoding, it may be determined that which video frame is referred to for decoding according to the identification information. In other words, the first reference frame combination or the second reference frame combination is determined according to the identification information of the video frame.

When a group of pictures is refreshed, the video frame received by the receiving end also carries refresh information. The refresh information may reflect that which video frame refresh is performed from, and which video frame is in the refreshed group of pictures. In this case, the first reference frame combination or the second reference frame combination is determined according to the refresh information of a group of pictures refresh and the identification information of the video frame included in the refreshed group of pictures.

Based on the above technical solution, the encoder side may encode the video frame and transmit the obtained forward reference frame to the receiving end, the receiving end may detect whether the forward reference frame is lost during transmission. When the $i^{th}$ forward reference frame in the group of pictures is lost during forward reference frame transmission, and during video decoding, when the $(i+T+1)^{th}$ forward reference frame is decoded, since the video frame in the first reference frame combination of the $(i+T+1)^{th}$ forward reference frame is located before the $(i+T+1)^{th}$ forward reference frame, and the $i^{th}$ forward reference frame is the video frame closest to the $(i+T+1)^{th}$ forward reference frame in the first reference frame combination with an interval of T forward reference frames from the $(i+T+1)^{th}$ forward reference frame, T being a positive integer, before the $(i+T+1)^{th}$ forward reference frame is decoded, there is more time for retransmitting the $i^{th}$ forward reference frame, to improve a possibility of completing retransmission of the $i^{th}$ forward reference frame when the $(i+T+1)^{th}$ reference frame is decoded, thereby reducing a possible waiting time for decoding the $(i+T+1)^{th}$ forward reference frame. Therefore, the receiving end may directly decode the $(i+T+1)^{th}$ forward reference frame using the first reference frame combination including the $i^{th}$ forward reference frame that is retransmitted. According to the method, encoding and decoding are performed according to a frame-straddling reference intra-period, to provide more time for completing retransmission of a lost forward reference frame in a reference frame combination before a certain forward reference frame is decoded, thereby reducing an impact of a forward reference frame loss on video playback at the receiving end. Based on this, the encoder side does not need to wait for the acknowledgement information fed back by the receiving end, and can directly encode a next forward reference frame, to reduce a delay at the encoder side, thereby reducing a delay of the video playback at the receiving end and improving smoothness of the video playback.

In addition, the embodiments of this application adopt frame-straddling reference, but the frame-straddling reference only slightly improves a transmission bit rate of the forward reference frame and has a little impact on the transmission bit rate of the forward reference frame, which is applied to a scenario of low-delay data transmission.

The following describes the data transmission method provided in the embodiments of this application with reference to an actual application scenario. In a scenario of 5G dedicated network remote control, such as a scenario of remote control driving, the server (encoder side) can transmit acquired high-definition pictures to a terminal (receiving end) of a user, for the user to remote control according to the high-definition pictures displayed on the terminal.

Figure 6:
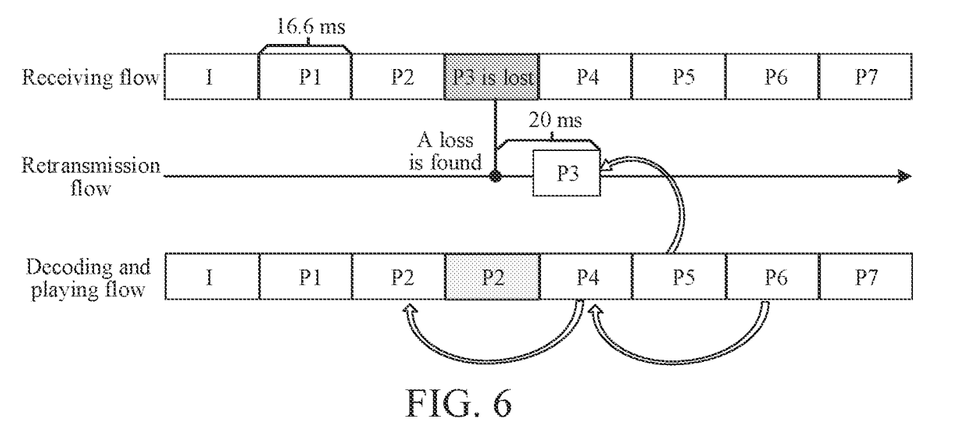
FIG. 6 is a schematic flowchart of processing of a receiving end according to an embodiment of this application.

The group of pictures shown in FIG. 5 is still used as an example, and the reference relationship between the video frame in the group of pictures are also shown in FIG. 5. The reference relationship is predetermined according to T (assuming that T is 1). The server may perform encoding and transmission on the video frame according to the reference relationship shown in FIG. 5. A processing procedure of the receiving end may be referred to FIG. 6, including a receiving flow of the receiving end, a retransmission flow of the receiving end, and a decoding and playing flow of the receiving end. The receiving flow is that the receiving end receives a data flow transmitted by the encoder side, the transmission flow is that the receiving end receives a data flow of a forward reference frame retransmitted by the encoder side, and the decoding and playing flow is that the receiving end performs decoding to render consecutive pictures. Frame duration of each video frame is 16.6 ms, and the receiving end receives the I frame, P1, P2. P3, P4, P5, P6, and P7 in sequence. From starting receiving P3 (a left edge of a rectangle block representing the forward reference frame P3) by the receiving end to a certain moment, for example, at a position of a dot shown in FIG. 6, it is found that P3 is lost, and the receiving end receives P3 retransmitted by the encoder side 20 ms after the loss is found. Correspondingly, in the decoding and playing flow, for I, P1, and P2 that are normally received, the receiving end normally performs decoding and restoring using the local reference frame cache. Because P3 is lost, during decoding of P3, an image corresponding to P2 may be reused for rendering to output an image corresponding to P3, only the image corresponding to P3 is the same as the image corresponding to P2. When P4 is decoded, P4 is decoded and played referring to P2. When P5 is decoded, since retransmission of P3 is completed before P5 is received, P5 may be decoded based on the P3 that is retransmitted. When P6 is decoded, P6 is decoded and played referring to P4. When P7 is decoded, P7 is decoded and played referring to P5. So far, playback of the group of pictures is completed.

Figure 7:
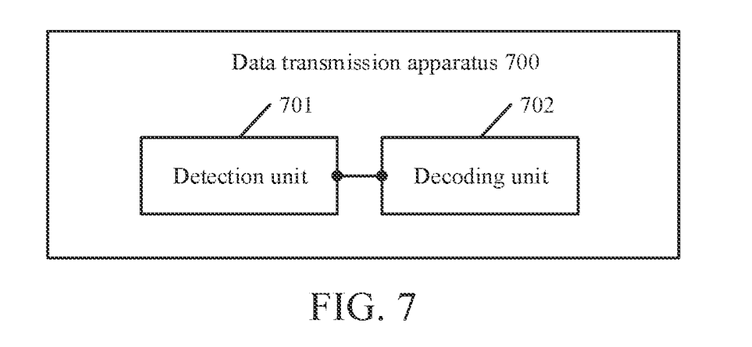
FIG. 7 is a structural diagram of a data transmission apparatus according to an embodiment of this application.

Based on the data transmission method provided in the embodiment corresponding to FIG. 4, the embodiments of this application further provide a data transmission apparatus. Referring to FIG. 7, an apparatus 700 includes a detection unit 701 and a decoding unit 702.

The detection unit 701 is configured to detect a receiving status of a forward reference frame.

The detection unit 701 is configured to detect that the $i^{th}$ forward reference frame in a group of pictures is lost during forward reference frame transmission, a video frame corresponding to the $i^{th}$ forward reference frame is located in a first reference frame combination of the $(i+T+1)^{th}$ forward reference frame, the video frame in the first reference frame combination is located before the $(i+T+1)^{th}$ forward reference frame, and the $i^{th}$ forward reference frame is a video frame closest to the $(i+T+1)^{th}$ forward reference frame in the first reference frame combination with an interval of T forward reference frames from the $(i+T+1)^{th}$ forward reference frame, T being a positive integer, and i being a positive integer greater than 0.

The decoding unit 702 is configured to decode the $(i+T+1)^{th}$ forward reference frame using the first reference frame combination including the $i^{th}$ forward reference frame that is retransmitted during video decoding, when the $(i+T+1)^{th}$ forward reference frame is decoded.

In a possible implementation, the decoding unit 702 is further configured to:

render, when retransmission of the $i^{th}$ forward reference frame is not completed during decoding of the it forward reference frame, the it forward reference frame reusing an image corresponding to a target video frame, the target video frame being a previous frame of the $i^{th}$ forward reference frame.

In a possible implementation, the decoding unit 702 is further configured to:

decode, when the $(i+1)^{th}$ forward reference frame is decoded, the $(i+1)^{th}$ forward reference frame using a second reference frame combination of the $(i+1)^{th}$ forward reference frame, a video frame in the second reference frame combination being located before the $(i+1)^{th}$ reference frame with an interval of at least T forward reference frames from the $(i+1)^{th}$ forward reference frame.

In a possible implementation, T is determined according to a retransmission delay, a product of frame duration of the forward reference frame and T+1 being greater than the retransmission delay.

In a possible implementation, the retransmission delay is determined by detecting duration of a forward reference frame loss, network retransmission duration, duration of decoding a forward reference frame, and catchable duration of a forward reference frame delay.

In a possible implementation, the first reference frame combination or the second reference frame combination is determined according to identification information of the video frame, and the identification information is used to reflect a reference relationship between video frames in a same group of pictures.

In a possible implementation, the first reference frame combination or the second reference frame combination is determined according to refresh information of a group of pictures refresh and the identification information of the video frame included in the refreshed group of pictures.

Figure 8:
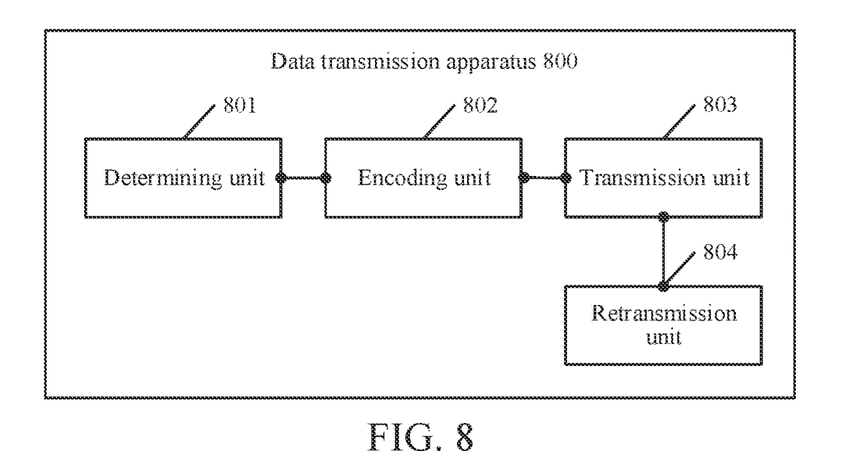
FIG. 8 is a structural diagram of a data transmission apparatus according to an embodiment of this application.

The embodiments of this application further provide a data transmission apparatus. Referring to FIG. 8, an apparatus 800 includes a determining unit 801, an encoding unit 802, a transmission unit 803, and a retransmission unit 804.

The determining unit 801 is configured to determine a reference frame combination corresponding to each to-be-encoded video frame in a group of pictures, and a video frame in the reference frame combination is located before the to-be-encoded video frame with an interval of at least T video frames from the to-be-encoded video frame, T being a positive integer.

The encoding unit 802 is configured to perform inter-frame encoding on each video frame through a corresponding reference frame combination to obtain a corresponding forward reference frame.

The transmission unit 803 is configured to transmit the obtained forward reference frame to a receiving end.

The retransmission unit 804 is configured to retransmit the $i^{th}$ forward reference frame to the receiving end, when acknowledgement information from the receiving end is received, and the acknowledgement information indicates that the $i^{th}$ forward reference frame is lost during forward reference frame transmission, i being a positive integer greater than 0.

In a possible implementation, T is determined according to a retransmission delay, a product of frame duration of the forward reference frame and T+1 being greater than the retransmission delay.

In a possible implementation, the retransmission delay is determined by detecting duration of a forward reference frame loss, network retransmission duration, duration of decoding a forward reference frame, and catchable duration of a forward reference frame delay.

In a possible implementation, the network retransmission duration is determined according to network quality, and the apparatus further includes an adjustment unit.

The adjustment unit is configured to adjust T according to the network quality after transmission of a group of pictures is completed; or adjust T according to the network quality during a group of pictures refresh.

Based on the above method, the embodiments of this application further provide a device for data transmission. The device may be a terminal, and that the terminal is a smart phone is used as an example.

Figure 9:
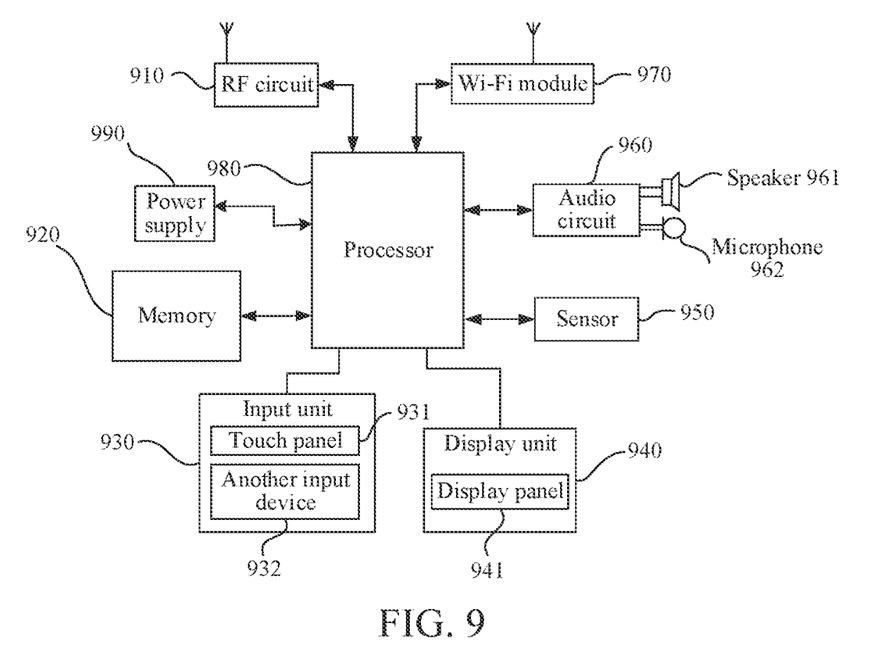
FIG. 9 is a structural diagram of a terminal according to an embodiment of this application.

FIG. 9 is a block diagram of a part of a structure of the mobile phone related to the terminal according to an embodiment of this application. Referring to FIG. 9, the smart phone includes: components such as a radio frequency (RF) circuit 910, a memory 920, an input unit 930, a display unit 940, a sensor 950, an audio circuit 960, a wireless fidelity (Wi-Fi) module 970, a processor 980, and a power supply 990. The input unit 930 may include a touch panel 931 and another input device 932. The display unit 940 may include a display panel 941. The audio circuit 960 may include a speaker 961 and a microphone 962.

The memory 920 may be configured to store a software program and a module. The processor 980 runs the software program and the module stored in the memory 920, to execute various functional applications of the smart phone and perform data processing.

The processor 980 is a control center of the smart phone, and is connected to various parts of the entire smart phone by using various interfaces and lines. By running or executing the software program and/or the module stored in the memory 920, and invoking data stored in the memory 920, the processor executes various functions of the smart phone and performs data processing.

In this embodiment, the processor 980 in the terminal may perform the following steps:

detecting a receiving status of a forward reference frame;

detecting that the $i^{th}$ forward reference frame in a group of pictures is lost during forward reference frame transmission, a video frame corresponding to the $i^{th}$ forward reference frame being located in a first reference frame combination of the $(i+T+1)^{th}$ forward reference frame, a video frame in the first reference frame combination being located before the $(i+1)^{th}$ forward reference frame, and the $i^{th}$ forward reference frame being a video frame closest to the $(i+T+1)^{th}$ forward reference frame in the first reference frame combination with an interval of T forward reference frames from the $(i+T+1)^{th}$ forward reference frame, T being a positive integer, and i being a positive integer greater than 0; and decoding, when the $(i+T+1)^{th}$ forward reference frame is decoded during video decoding, the $(i+T+1)^{th}$ forward reference frame using a first reference frame combination including the $i^{th}$ forward reference frame that is retransmitted.

or, determining a reference frame combination corresponding to each to-be-encoded video frame in a group of pictures, a video frame in the reference frame combination being located before the corresponding to-be-encoded video frame with an interval of at least T video frames from the to-be-encoded video frame, T being a positive integer;

performing inter-frame encoding on each video frame in sequence through a corresponding reference frame combination to obtain a corresponding forward reference frame, and transmitting the obtained forward reference frame to a receiving end; and retransmitting the $i^{th}$ forward reference frame to the receiving end when acknowledgement information from the receiving end is received, and the acknowledgement information indicates that the $i^{th}$ forward reference frame is lost during forward reference frame transmission, i being a positive integer greater than 0.

Figure 10:
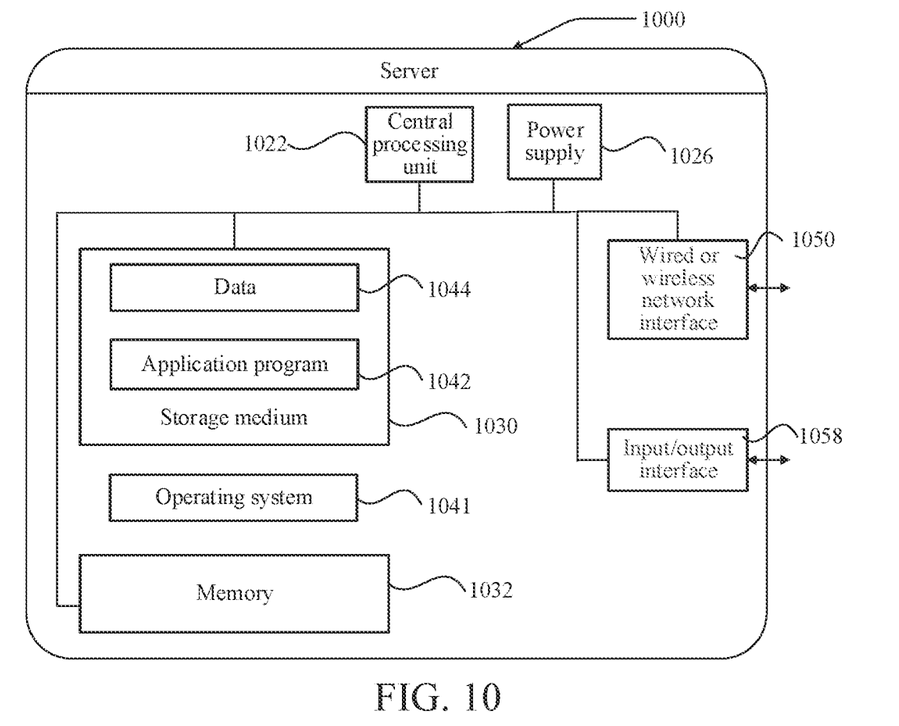
FIG. 10 is a structural diagram of a server according to an embodiment of this application.

The embodiments of this application further provide a server. FIG. 10 is a structural diagram of a server 1000 according to an embodiment of this application. The server 1000 may vary greatly due to different configurations or performance, and may include one or more central processing units (CPUs) 1022 (for example, one or more processors) and a memory 1032, and one or more storage media 1030 (for example, one or more mass storage devices) that store application programs 1042 or data 1044. The memory 1032 and the storage medium 1030 may be transient or persistent storages. The program stored in the storage medium 1030 may include one or more modules (not marked in the figure), and each module may include a series of instruction operations to the server. Further, the CPU 1022 may be configured to communicate with the storage medium 1030, and perform, on the server 1000, the series of instruction operations in the storage medium 1030.

The server 1000 may further include one or more power supplies 1026, one or more wired or wireless network interfaces 1050, one or more input/output interfaces 1058, and/or one or more operating systems 1041, for example, Windows Server™, Mac OS X™, Unix™, Linux™, or FreeBSD™.

In this embodiment, the central processing unit 1022 in the server may perform the following steps:

determining a reference frame combination corresponding to each to-be-encoded video frame in a group of pictures, a video frame in the reference frame combination being located before the corresponding to-be-encoded video frame with an interval of at least T video frames from the to-be-encoded video frame, T being a positive integer;

performing inter-frame encoding on each video frame in sequence through a corresponding reference frame combination to obtain a corresponding forward reference frame, and transmitting the obtained forward reference frame to a receiving end; and retransmitting the $i^{th}$ forward reference frame to the receiving end when acknowledgement information from the receiving end is received, and the acknowledgement information indicates that the $i^{th}$ forward reference frame is lost during forward reference frame transmission, i being a positive integer greater than 0.

According to an aspect of this application, a non-transitory computer-readable storage medium is provided, configured to store program code, the program code being used for performing the data transmission method according to the foregoing embodiments.

According to an aspect of this application, a computer program product or a computer program is provided, including computer instructions, the computer instructions being stored in a non-transitory computer-readable storage medium. A processor of a computer device reads the computer instructions from the computer-readable storage medium, and executes the computer instructions, so that the computer device performs the method provided in the various optional implementations in the foregoing embodiments.

In the specification and the accompanying drawings of this application, the terms "first", "second", "third", "fourth", and the like (if existing) are intended to distinguish between similar objects rather than describe a specific order or a sequence. It may be understood that the data used in such a way is interchangeable in proper circumstances, so that the embodiments of this application described herein can be implemented in other sequences than the sequence illustrated or described herein. Moreover, the terms "comprise", "include", and any other variants thereof are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

In the several embodiments provided in this application, it is to be understood that the disclosed system, apparatus, and method may be implemented in other manners. For example, the above-described apparatus embodiment is only exemplary. For example, the division of the units is only a logical function division and may be other divisions during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, and may be located in one position, or may be distributed on a plurality of network units. Some or all of the units may be selected according to an actual requirement to achieve the objectives of the solutions in the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software function unit.

When the integrated unit is implemented in the form of a software functional unit and sold or used as an independent product, the integrated unit may be stored in a non-transitory computer-readable storage medium. Based on such an understanding, the technical solutions of this application essentially, or the part contributing to the related art, all or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The storage medium includes: any medium that can store program code, such as a USB flash drive, a removable hard disk, a read-only memory (ROM), a random access memory (RAM), a magnetic disk, or an optical disk.

The foregoing embodiments are merely intended for describing the technical solutions of this application, but not for limiting this application. Although this application is described in detail with reference to the foregoing embodiments, it is to be understood by a person skilled in the art that, modifications may still be made to the technical solutions described in the foregoing embodiments, or equivalent replacements may be made to the part of the technical features; and such modifications or replacements will not cause the essence of corresponding technical solutions to depart from the scope of the technical solutions in the embodiments of this application.

What is claimed is:

1. A data transmission method, performed by a computer device, the method comprising:
   detecting a receiving status of a forward reference frame;
   detecting that the $i^{th}$ forward reference frame in a group of pictures is lost during forward reference frame transmission from an encoder, a video frame corresponding to the $i^{th}$ forward reference frame being located in a first reference frame combination of the $(i+T+1)^{th}$ forward reference frame, a video frame in the first reference frame combination being located before the $(i+T+1)^{th}$ forward reference frame, and the $i^{th}$ forward reference frame being a video frame closest to the $(i+T+1)^{th}$ forward reference frame in the first reference frame combination with an interval of T forward reference frames from the $(i+T+1)^{th}$ forward reference frame, T being a positive integer, and i being a positive integer greater than 0, wherein T is determined such that a product of frame duration of a forward reference frame and T+1 is greater than a retransmission delay caused by a retransmission of a lost forward reference frame from the encoder; and
   when the $(i+T+1)^{th}$ forward reference frame is decoded during video decoding, decoding the $(i+T+1)^{th}$ forward reference frame using a first reference frame combination comprising the $i^{th}$ forward reference frame that is retransmitted from the encoder.

2. The method according to claim 1, further comprising:
when retransmission of the $i^{th}$ forward reference frame is not completed during decoding of the $i^{th}$ forward reference frame, rendering the $i^{th}$ forward reference frame reusing an image corresponding to a target video frame, the target video frame being a previous frame of the $i^{th}$ forward reference frame.

3. The method according to claim 1, further comprising:
when the $(i+1)^{th}$ forward reference frame is decoded, decoding the $(i+1)^{th}$ forward reference frame using a second reference frame combination of the $(i+1)^{th}$ forward reference frame, a video frame in the second reference frame combination being located before the $(i+1)^{th}$ forward reference frame with an interval of at least T forward reference frames from the $(i+1)^{th}$ forward reference frame.

4. The method according to claim 1, wherein the retransmission delay is determined by detecting duration of a forward reference frame loss, network retransmission duration, duration of decoding a forward reference frame, and catchable duration of a forward reference frame delay.

5. The method according to claim 1, wherein the first reference frame combination or the second reference frame combination is determined according to identification information of the video frame, and the identification information is used to reflect a reference relationship between video frames in a same group of pictures.

6. The method according to claim 5, wherein the first reference frame combination or the second reference frame combination is determined according to refresh information of a group of pictures refresh and identification information of a video frame comprised in a refreshed group of pictures.

7. A computer device, comprising a processor and a memory,
the memory being configured to store program codes that, when executed by the processor, cause the computer device to perform a data transmission method including:
detecting a receiving status of a forward reference frame;
detecting that the $i^{th}$ forward reference frame in a group of pictures is lost during forward reference frame transmission from an encoder, a video frame corresponding to the $i^{th}$ forward reference frame being located in a first reference frame combination of the $(i+T+1)^{th}$ forward reference frame, a video frame in the first reference frame combination being located before the $(i+T+1)^{th}$ forward reference frame, and the $i^{th}$ forward reference frame being a video frame closest to the $(i+T+1)^{th}$ forward reference frame in the first reference frame combination with an interval of T forward reference frames from the $(i+T+1)^{th}$ forward reference frame, T being a positive integer, and i being a positive integer greater than 02 wherein T is determined such that a product of frame duration of a forward reference frame and T+1 is greater than a retransmission delay caused by a retransmission of a lost forward reference frame from the encoder; and
when the $(i+T+1)^{th}$ forward reference frame is decoded during video decoding, decoding the $(i+T+1)^{th}$ forward reference frame using a first reference frame combination comprising the $i^{th}$ forward reference frame that is retransmitted from the encoder.

8. The computer device according to claim 7, wherein the method further comprises:
when retransmission of the $i^{th}$ forward reference frame is not completed during decoding of the $i^{th}$ forward reference frame, rendering the $i^{th}$ forward reference frame reusing an image corresponding to a target video frame, the target video frame being a previous frame of the $i^{th}$ forward reference frame.

9. The computer device according to claim 7, wherein the method further comprises:
when the $(i+1)^{th}$ forward reference frame is decoded, decoding the $(i+1)^{th}$ forward reference frame using a second reference frame combination of the $(i+1)^{th}$ forward reference frame, a video frame in the second reference frame combination being located before the $(i+1)^{th}$ forward reference frame with an interval of at least T forward reference frames from the $(i+1)^{th}$ forward reference frame.

10. The computer device according to claim 7, wherein the retransmission delay is determined by detecting duration of a forward reference frame loss, network retransmission duration, duration of decoding a forward reference frame, and catchable duration of a forward reference frame delay.

11. The computer device according to claim 7, wherein the first reference frame combination or the second reference frame combination is determined according to identification information of the video frame, and the identification information is used to reflect a reference relationship between video frames in a same group of pictures.

12. The computer device according to claim 11, wherein the first reference frame combination or the second reference frame combination is determined according to refresh information of a group of pictures refresh and identification information of a video frame comprised in a refreshed group of pictures.

13. A non-transitory computer-readable storage medium, storing program codes that, when executed by a processor of a computer device, cause the computer device to perform a data transmission method including:
detecting a receiving status of a forward reference frame;
detecting that the $i^{th}$ forward reference frame in a group of pictures is lost during forward reference frame transmission from an encoder, a video frame corresponding to the $i^{th}$ forward reference frame being located in a first reference frame combination of the $(i+T+1)^{th}$ forward reference frame, a video frame in the first reference frame combination being located before the $(i+T+1)^{th}$ forward reference frame, and the $i^{th}$ forward reference frame being a video frame closest to the $(i+T+1)^{th}$ forward reference frame in the first reference frame combination with an interval of T forward reference frames from the $(i+T+1)^{th}$ forward reference frame, T being a positive integer, and i being a positive integer greater than 0, wherein T is determined such that a product of frame duration of a forward reference frame and T+1 is greater than a retransmission delay caused by a retransmission of a lost forward reference frame from the encoder; and
when the $(i+T+1)^{th}$ forward reference frame is decoded during video decoding, decoding the $(i+T+1)^{th}$ forward reference frame using a first reference frame combination comprising the $i^{th}$ forward reference frame that is retransmitted from the encoder.

14. The non-transitory computer-readable storage medium according to claim 13, wherein the method further comprises:
when retransmission of the $i^{th}$ forward reference frame is not completed during decoding of the $i^{th}$ forward reference frame, rendering the $i^{th}$ forward reference frame reusing an image corresponding to a target video frame, the target video frame being a previous frame of the $i^{th}$ forward reference frame.

15. The non-transitory computer-readable storage medium according to claim 13, wherein the method further comprises:

when the $(i+1)^{th}$ forward reference frame is decoded, decoding the $(i+1)^{th}$ forward reference frame using a second reference frame combination of the $(i+1)^{th}$ forward reference frame, a video frame in the second reference frame combination being located before the $(i+1)^{th}$ forward reference frame with an interval of at least T forward reference frames from the $(i+1)^{th}$ forward reference frame.

16. The non-transitory computer-readable storage medium according to claim 13, wherein the retransmission delay is determined by detecting duration of a forward reference frame loss, network retransmission duration, duration of decoding a forward reference frame, and catchable duration of a forward reference frame delay.

17. The non-transitory computer-readable storage medium according to claim 13, wherein the first reference frame combination or the second reference frame combination is determined according to identification information of the video frame, and the identification information is used to reflect a reference relationship between video frames in a same group of pictures.

* * * * *